United States Patent
Kalhoff et al.

(10) Patent No.: US 8,011,021 B2
(45) Date of Patent: Sep. 6, 2011

(54) CORRELATION OF DATA OF A CONTROL AND/OR DATA TRANSMISSION SYSTEM AND OF A SYSTEM MODEL REPRESENTING IT

(75) Inventors: Johannes Kalhoff, Blomberg (DE); Dietmar Krumsiek, Emmerthal (DE); Martin Mueller, Luedge (DE); Oliver Puls, Lemgo (DE); Willi Hagemeier, Schieder-Schwalenberg (DE); Frank Konieczny, Lemgo (DE); Frank Knafla, Detmold (DE)

(73) Assignee: Phoenix Contact GmbH & Co. KG (DE)

( * ) Notice: Subject to any disclaimer, the term of this patent is extended or adjusted under 35 U.S.C. 154(b) by 252 days.

(21) Appl. No.: 12/105,875

(22) Filed: Apr. 18, 2008

(65) Prior Publication Data

US 2008/0273466 A1   Nov. 6, 2008

(30) Foreign Application Priority Data

Apr. 20, 2007  (DE) .......................... 10 2007 019 201

(51) Int. Cl.
*G06F 11/00* (2006.01)
(52) U.S. Cl. .......................................................... 2/117
(58) Field of Classification Search .................... 702/117
See application file for complete search history.

(56) References Cited

U.S. PATENT DOCUMENTS

| | | | | |
|---|---|---|---|---|
| 6,975,952 B1 * | 12/2005 | Dietermann et al. | ......... | 702/117 |
| 2004/0012264 A1 * | 1/2004 | Burger et al. | ................... | 307/64 |
| 2004/0199837 A1 * | 10/2004 | Meyer-Grafe et al. | ....... | 714/712 |
| 2006/0192671 A1 * | 8/2006 | Isenmann et al. | ............. | 340/531 |
| 2007/0192332 A1 * | 8/2007 | Deuter et al. | ................... | 707/10 |
| 2007/0255520 A1 * | 11/2007 | Becker et al. | ................. | 702/127 |
| 2008/0150713 A1 * | 6/2008 | Kalhoff et al. | ................ | 340/532 |
| 2010/0071439 A1 * | 3/2010 | Caron | ........................... | 73/1.38 |

FOREIGN PATENT DOCUMENTS

DE         3809771 A1      10/1989
(Continued)

OTHER PUBLICATIONS

Abourida, et al., "Real-Time PC Based Simulator of Electric Systems and Drives", "XP-010582955", Mar. 10, 2002, Publisher: Apec 2002 17th Annual IEEE Applied Power Electronics Conference and Exposition Dallas, TX, Mar. 10-14, 2002, Published in: New York.

(Continued)

*Primary Examiner* — Cindy Hien-Dieu Khuu

(74) *Attorney, Agent, or Firm* — DeMont & Breyer, LLC

(57) ABSTRACT

Methods are disclosed for testing the functionality of a system element to be used inside a control and/or data processing system as well as, in essentially the opposite direction, for designing a system model having at least one transmission function for modeling a control and/or data transmission system with at least one system element. A data-processing device for performing this method is also disclosed, which device comprises a signal unit that can be coupled to a constructed system element for producing a control and/or data transmission system, for reading out, querying or receiving a signal output of the system element in response to a predetermined signal voltage applied at the system element, an evaluation unit for evaluating the signal output as a function of the input signal in order to analyze the system element, and a processing unit for associating the analyzed system element with a transmission function.

11 Claims, 3 Drawing Sheets

FOREIGN PATENT DOCUMENTS

| | | |
|---|---|---|
| DE | 103 11 027 A1 | 9/2004 |
| DE | 10308955 A1 | 9/2004 |
| DE | 102004050293 B3 | 5/2006 |
| DE | 102005001427 A1 | 7/2006 |
| DE | 102006051444 A1 | 5/2008 |
| EP | 0895197 A1 | 3/1999 |
| EP | 1 189 126 B1 | 3/2002 |
| EP | 1 662 346 A2 | 5/2006 |
| WO | 2006018410 A1 | 2/2006 |

OTHER PUBLICATIONS

Jean Belanger, "Real-Tiem Simulation Technologies for the Simulation of Electric Drives and Large Systems", "Opal-RT Technologies", 2004, Publisher: www.opal-rt.com SAE 2004 (XP-002420326).

David A. Glanzer, "Foundation Feildbus Technical Overview FD-043 Revision 3.0", "Fieldbus Foundation Technical Overview", 1996, Publisher: Fieldbus Foundation, Published in: US.

Heinz Woern, et al., "Real-Time Systems (Echtzeitsysteme)", "ISBN : 978-3-540-20588-3", Apr. 2005, Publisher: Springer Berlin , Published in: DE.

"General Purpose Field Communication System", "European Standard (Final Draft)", Feb. 1997, Publisher: Cenelec, Published in: EP.

Boehmert & Boehmkert, "Patent Application DE 10 2007 019 201 S31730 Office Action Appendices", Sep. 3, 2009, Published in: DE.

Martin Sundin, "EP Application No. EP 08 00 4882 Search Report", Sep. 3, 2009, Published in: EP.

\* cited by examiner

CORRELATION OF DATA OF A CONTROL AND/OR DATA TRANSMISSION SYSTEM AND OF A SYSTEM MODEL REPRESENTING IT

FIELD OF THE INVENTION

The invention relates to the correlation of data of a control and/or data transmission system comprising a number of system elements and of a system model representing the control and/or data transmission system, and in particular, a method for testing the functionality of a system element of a control and/or data transmission system, a method for designing a system for representing a control and/or data transmission system, as well as data-processing devices for implementing the method.

BACKGROUND OF THE INVENTION

At the present time, system elements of a control and/or data transmission system, such as an automation system, are put into operation manually and from a "signal perspective," i.e., path by path. A considerable disadvantage in this case is the laborious testing of these components, the high susceptibility to error and the inflexible reaction to changes in the cabling or connection and in the exchange of system elements or operating means. Moreover, automated provision of help for a user with a low degree of knowledge is not sufficiently supported.

SUMMARY OF THE INVENTION

The problems of the invention can thus be considered to be the simplification of the sequence of actions that are necessary for the installation of a control and/or data transmission system, testing it and its adaptation to a system model representing a control and/or data transmission system, in order, in particular, to increase the engineering productivity during initial operation and in operation and in order to test and or implement in a simple manner the processing steps to be executed in the participating system elements or operating means of a control and/or data transmission system.

The preferred embodiments and refinements described herein can be combined in any desired manner with one another, insofar as the contrary is not explicitly stated.

The invention provides data correlation methods for testing the functionality of the system element to be employed in a control and/or data processing system as well as, in essentially the opposite direction, for designing a system model having at least one transmission function for modeling a control and/or data transmission system with at least one system element. The invention also provides data-processing devices adapted to the performance of the invented method, in particular also mobile data-processing devices with which the correlation of data of a control and/or data transmission system comprising a number of system elements, and of a model representing the control and/or data transmission system is significantly simplified.

Essential steps for the invented method for testing the functionality of a system element to be employed in a control and/or data transmission system comprise the design of a system model with at least one transmission function for modeling a control and/or data processing system comprising at least one system element, the construction of a system for producing the control and/or data processing system based on the system model, the testing of the connection or integration of the constructed system element in the at least partially produced control and/or data processing system, and the computer-assisted correlation of the result of the system element analysis with the at least one transmission function.

The correlation step expediently contains the steps of associating the system element with a transmission function of the system model, and of validating the system element based on this transmission function.

In order to be able to provide additional help to a user, it is advantageous to display the analysis and/or correlation result.

In a practical implementation, the system model with the at least one transmission function is stored and a correlation step contains the accessing of the stored contents.

The invention further preferably provides the performance of the analyzing and correlation steps by means of a mobile data-processing device, or centrally, by means of a data-processing device connected to the system.

According to the invention, the essential process steps for the design of a system model comprising at least one transmission function for modeling a control and/or data transmission system with at least one system element include: the construction of a system element for producing a control and/or data transmission system, the testing of the connection or integration of the constructed system element in the at least partially produced control and/or data transmission system by analyzing the system element, as well as the computer-assisted calculation of a transmission function specifying the system element, using the results of the system element analysis, and the design of a system model having at least this transmission function. Here as well, it is advantageous to display the calculation result in order to provide a user with additional help. The calculation result is expediently stored in a readable memory for further use.

In this correlation direction, the invention also preferably provides that the analysis and calculation steps be performed by means of a mobile data-processing device, or centrally by means of a data-processing device connected to the system.

In a practical embodiment, the step of constructing a system element, independently of the correlation direction, contains the construction of at least one system component or the construction of at least one subsystem.

An essential core conception of the invention is consequently to perform the correlation between a control and/or data processing system and a system model that models it on the basis of an expectation, which is specified by the preceding design of the system model for a control and/or data processing system to be produced based on a system model, or which will be transferred, after the connection and/or integration of respective system elements into the control and/or data processing system, to a system model to be designed based on an at least partially produced control and/or data processing system. Thus for instance, the design of a system model with at least one transmission function for modeling a control and/or data processing system comprising at least one system element leads to an expectation with respect to a special transmission behavior and/or a special system element at a predetermined position in the control and/or data processing system. The connection or integration of a system element with a special transmission behavior and/or a special identifier at a given point in the control and/or data processing system leads, on the other hand, to an expectation with respect to a special transmission function at this point in the system model.

According to a first preferred group of embodiments, the analysis step for correlation in one direction or the other contains the step of determining the transmission behavior of the system element by applying a predetermined signal input and evaluating the respective signal output, i.e., in particular, the application of a predetermined input signal to the system element and the evaluation of the respective output signal of the system element.

The signal input is preferably applied in this case via the produced control and/or data transmission system or by directly supplying a signal from the exterior to the system element.

Additionally or alternatively to the first preferred group of embodiments, the analysis step in a second preferred group body of embodiments contains a step of automatically recognizing a system element identifier.

The system element identifier is also preferably recognized via the produced control and/or data processing system, or by directly supplying a readout and/or query signal from the outside to the system element.

In a practical implementation, the analysis and design steps further comprise, independently of the correlation direction, the step of generating a dataset that is unambiguously associated with the connection or integration of the analyzed system element into the system.

A data-processing device according to the invention, in particular a mobile data-processing device, which can be a PC or laptop or a notebook, for carrying out these data correlation methods is characterized by a signal unit, suitable for coupling to a constructed system element for producing a control and/or data transmission system, in order to read out, query or receive a signal output from the system element in response to a predetermined signal input applied to the system element; an evaluation unit for evaluating the signal output as a function of the signal input in order to analyze the system element; and a computer-assisted processing unit for associating the analyzed system element with a transmission function.

According to a preferred embodiment variant, the data-processing device comprises an evaluation unit that is constructed for determining a transmission behavior.

It is of further advantage if the data-processing device comprises a storage unit for readable storage of transmission functions, wherein the processing unit for associating the determined transmission behavior with a transmission function analyzes the determined transmission behavior using at least one stored transmission function.

Additionally or alternatively to the first preferred embodiment variant, the evaluation unit in a second preferred embodiment variant is constructed for recognizing a system element identifier.

In this case, the processing unit for associating the recognized system element identifier with a transmission function is expediently constructed for analyzing the recognized system element identifier using at least one stored transmission function.

The data-processing device is expediently constructed with a display unit for displaying the results of the analysis and/or the association.

In a practical manner, the processing unit of the data-processing device automatically associates the determined transmission behavior and/or the recognized system element identifier with the transmission function.

The at least one transmission function of a system model representing the produced control and/or data transmission system is preferably stored in the storage unit.

Additionally or alternatively, the processing unit for associating the given transmission behavior with a transmission function is constructed to calculate a transmission function using the determined transmission behavior and/or the recognized system element identifier.

Here the data-processing device preferably comprises a storage unit for readable storage of calculated transmission functions and/or has a display unit for displaying the calculation result.

It is further expedient if the signal unit of the data-processing device comprises signal supply units connectable to the system element in order to apply the signal input to the system element.

The invention thus offers the possibility of determining signal paths of a control and/or data transmission system in advance and consequently, from a system element or operating means connected at any point to the system, of outputting or reading out data relating to the position and the installation point of the system element inside the system, and thus of also obtaining data on an additional connection or a downstream element.

Thus, for instance, the user is capable in the simplest manner of checking an Ethernet-capable operating means with respect to its wiring or installation in the system, for example, in regard to the connection to a cable or a port to be used, and of passing on additional information such as the parameterization and/or MAC address to the system via the data-processing device.

The user is thus additionally capable of inserting or exchanging a suitable system element or operating means at any point of the system, and connecting it to an additional operating means and/or a signal, and of subsequently reporting this to the system.

In addition, this information is also simultaneously usable for labeling the operating means. Such a label can be laser-inscribed on-site and/or provided by means of an embossed tape, an adhesive strip and/or a nameplate on the operating means.

In the opposite data correlation direction, i.e. in the case of a control and/or data transmission system to be constructed, such as, in particular, a bus system in which the wiring of the individual operating means is performed first, the signal path to the system is directly determined by the testing of the wiring, and is transferred to the system and the resulting design.

BRIEF DESCRIPTION OF THE DRAWINGS

Additional advantages and characteristics of the invention will become evident from the description below of a preferred embodiment with reference to the appended drawings. In the drawings.

DETAILED DESCRIPTION

Figure 1:
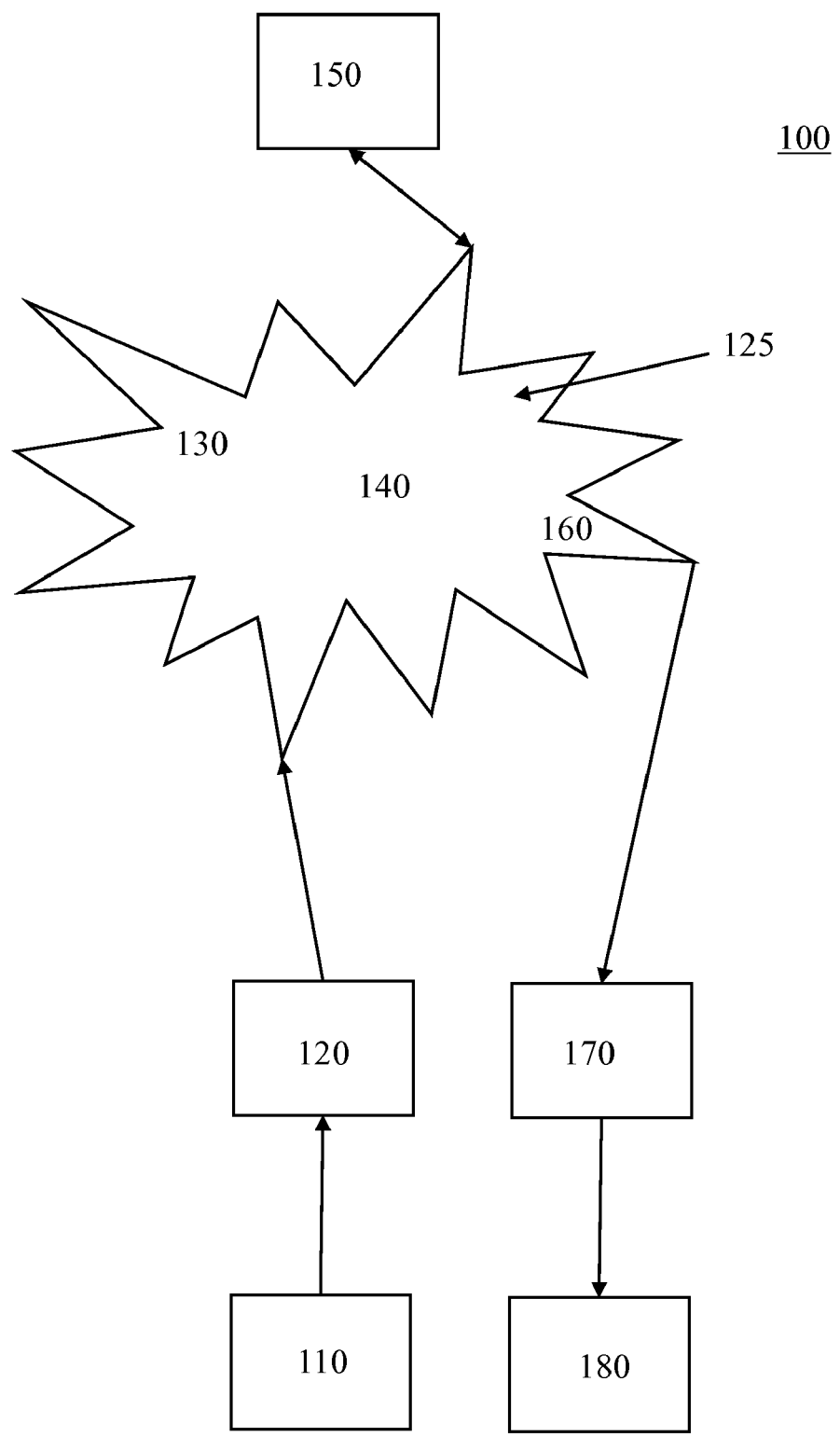
FIG. 1 shows a graphically highly schematized sketch of a section of a system model for modeling a control and/or data transmission system.
Figure 2:
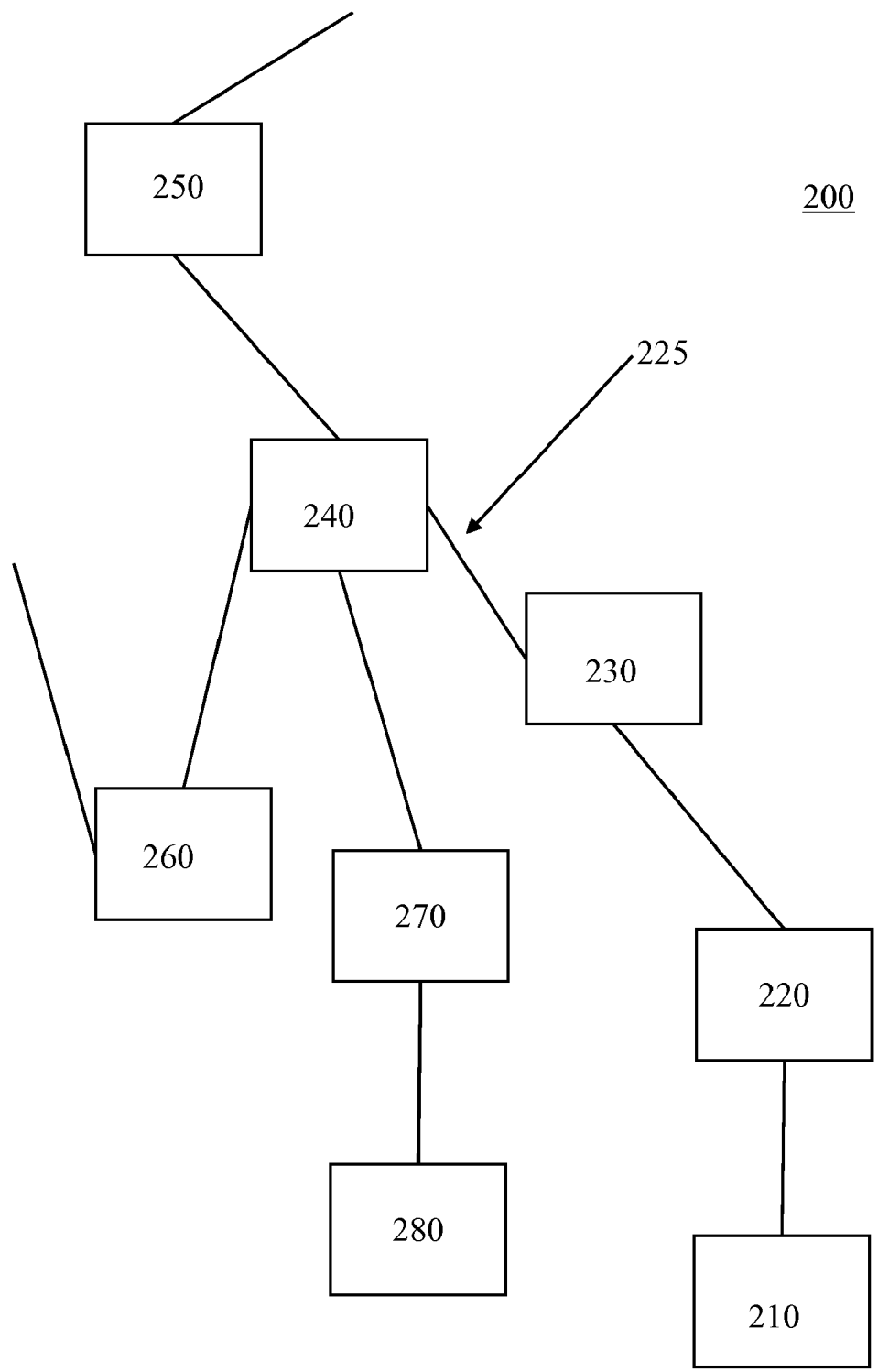
FIG. 2 a graphically highly schematized sketch of a section of the control and/or data processing system with system elements or operating means connected via a bus.

The reader is referred first to FIGS. 1 and 2. FIG. 1 shows, greatly simplified, parts of a system model 100 representing a control and/or data transmission system for the planning of the system in advance. FIG. 2 represents parts of an actually constructed control and/or data transmission system 200 corresponding to system model 100 (FIG. 1), with system elements 210, 220, 230, 240, 250, 260, 270 and 280 installed and connected or physically linked via a bus 225.

In the illustrated example, it is assumed that reference number 110 indicates the transmission function, stored in system model 100, of a sensor 210, which, according to the invention, is a system element of the control and/or data-processing circuit 200 corresponding to the system model.

The transmission function thus represents a special sensor comprising a photoelectric barrier that is constructed to output an analog signal. Reference number 120 correspondingly designates the transmission function of a given converter device 220 that converts the analog signals coming from sensor 210 into digital data. The converted data is subsequently supplied as input data to a network designated in general by 125, in relation to which the transmission functions of additional operating means necessary for the model formation that are comprised by the network for signal processing are determined and stored. For example, transmission functions 130, 140 and 160 of FIG. 2 are those of operating means labeled 230, 240 and 260, which are connected to one another via a bus 225, for instance. Such operating means or system elements can be electrical, electronic, electromechanical, optical or of another type.

A transmission function indicated by reference number 170 then indicates, for example, the signal processing of a special A/D converter 270, at which an analog signal present on the input side is processed into a digital signal to be provided on the output side. This signal then functions as a control signal for a downstream actuator 280 in the control and/or data transmission system 200, whose transmission function 180 is in turn stored in the system model 100. The planned network 125 is additionally intended to be connected to a phase-locked control loop 250 for cycle synchronization, whose signal or transmission function required for application-specific frequency comparison is reproduced by a correspondingly suitable transmission function 150.

Consequently, individual signal paths, and thus connected signal transitions as well, are individually and specifically specified in the course of the design of a control and/or data transmission system. According to the present example, an analog sensor output signal is thus present at the input of a system element 220 in the correspondingly produced system, and a digital signal at the output. This signal is in turn supplied as an input signal for further processing to a system element which is constructed at a predetermined position in the appropriately implemented network of the produced control and/or data transmission system and has a transmission behavior based on the transmission function of the system model. A digital input signal is present at the input of operating means 270, and an analog signal at its output, which signal is further processed by an actuator as a control signal.

Thus the signal paths and signal transitions through all types of operating means, such as devices, cables, plugs, terminals, variables, visualization tacks and so on are stored by means of the respective transmission functions in the system model and kept there, and consequently lead to special expectations of the actual system.

Figure 3:
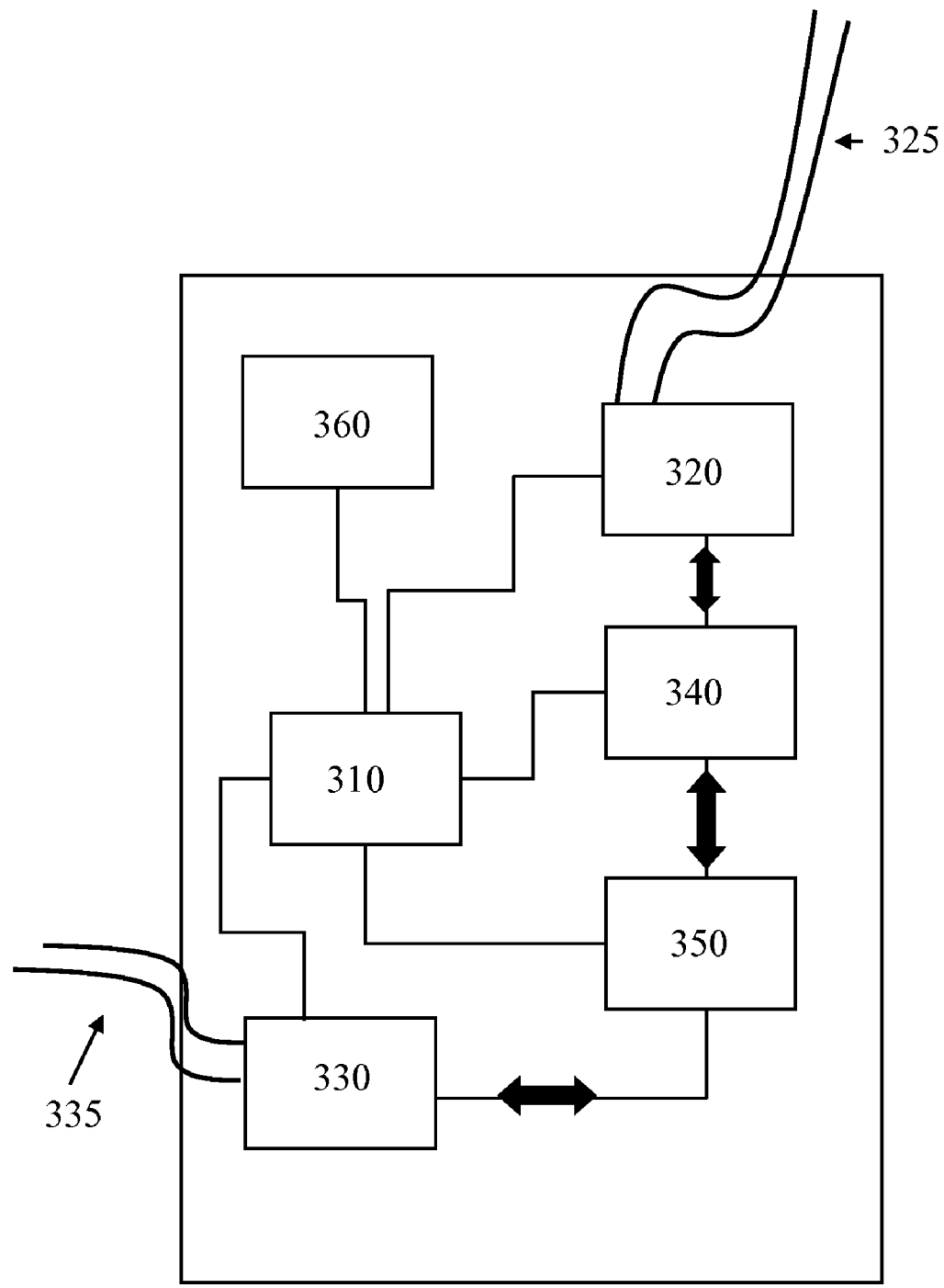
FIG. 3 a data-processing device according to the invention, highly simplified.

A data-processing device or a data correlation device 300 according to the invention is reproduced in greatly simplified form in FIG. 3. The illustrated device 300 has a control unit 310 that comprises a CPU, for example, and additional units suitable for cooperating with the control unit 310.

The units illustrated in FIG. 3 comprise a signal unit 320, a storage unit 330, a signal evaluation unit 340, a processing unit 350 and an operating/monitor unit 360.

Transmission functions as planning data of the system model can be interchanged via data lines 335 with an external device on which a system model, e.g., system model 100, is stored, and can be read into storage unit 330 and/or read out of it.

The connection to selected system elements and a respective signal transmission from at least one system element to signal unit 320 takes place via data line 325.

This signal unit is adapted in particular to read out, query and/or receive, after coupling to the selected system element, the output signals or a signal output of the system element in response to a predetermined input signal applied to it. In a preferred embodiment, signal unit 320 is further adapted to feed external signals in order to apply an input signal or a signal input to the selected system element. In an alternative embodiment, not shown in the figures however, such a signal input is also applied via a ready-made (sub)system.

It may be pointed out at this point that it is also possible to use a data-processing device in the invention, which, alternatively or in addition to units for wire-line exchange of data as sketched in FIG. 3, also has units for wireless exchange of data.

The output signal coming from the selected system element is evaluated by way of signal evaluation unit 340, the latter performing the evaluation of the signal output as a function of the signal input for the analysis of the system element, particularly for determining a transmission behavior of the system element and/or for recognizing a system element identifier. If the signal is not input via data processing unit 350, the information necessary for it can be supplied, for instance, via unit 360, via units 335 and/or, with appropriate wiring, via units 325.

Supported by control unit 310, processing unit 350 performs the processing of data that comes from signal evaluation unit 320 and is destined for storage unit 330 or conversely. Processing unit 350 consequently also performs an association between the data that comes from signal evaluation unit 320 and/or is destined for it, with data that comes from storage unit 330 or is destined for it.

A validation of the selected system element, including the verification of a correct connection or integration of the system element, can consequently be performed in a simple manner inside the system.

Additionally or alternatively, the connection of a device/operating means and its automatic recognition by the system can already lead to its verification. For this purpose as well, according to the invention, an expectation resulting from the transmission function, for instance, that a given device has been planned at a given position in the system, can be automatically reconciled with the actual system. The recognition is performed, for instance, by the actual system which consequently communicates or makes available the operating means and/or a suitable signal to the data-processing device, and the latter then generates and displays the correlation.

The data-processing device shown in FIG. 3 is thus a mobile, transportable and flexibly usable device. Alternatively, however, a device connected centrally to the control and/or data transmission system can also be used within the scope of the invention. Data-processing devices within the scope of the invention are thus also PCs and laptops or notebooks.

In order to perform the invented method, in which the functionality of a system element to be used inside a control and/or data transmission system is to be tested, data-processing device 300 is set to a processing mode in which transmission functions of a system model stored in the storage unit are read out, and, in order to associate the determined transmission behavior and/or a recognized system element identifier with a transmission function, processing unit 350 correlates the ascertained transmission behavior and/or the recognized system element identifier by using at least one transmission function. The correlation result can expediently be displayed on operating/monitor unit 360. In one practical embodiment, the association of the ascertained transmission behavior and/or the recognized system element identifier with a transmission function is performed automatically.

Consequently, if a data correlation method between the data of a system model and the data of a control and/or data transmission system based on it is to be performed in order to test the functionality of a system element to be utilized inside a control and/or data transmission system, this is then done according to a preferred embodiment by first designing a system model with at least one transmission function for modeling a control and/or data transmission system with at least one system element. Based on the system model, one or more system elements for producing the control and/or data transmission system are then appropriately constructed. At essentially any time, a check of the connection or integration of the system element in the at least partially produced control and/or data transmission system can then be performed by analyzing the system element, in particular, the transmission function of a selected system element, by applying a predetermined input signal and evaluating the respective output signal, and/or by an automatic recognition of a system element identifier, and the validation of the system element inside the control and/or data transmission system can be performed by correlating the transmission behavior or the system element identifier with the at least one transmission function. For this purpose, the system element is associated, based on the transmission behavior and/or the system element identifier, with a transmission function of the system model, and the validation of the system element is in turn performed based on this transmission function.

To perform the method of the invention, in which a system model is to be designed that has at least one transmission function for modeling a control and/or data transmission system with at least one system element, data-processing device 300 is set to a processing mode in which, in order to associate the ascertained transmission behavior and/or a recognized system element identifier with the transmission function, a transmission function is calculated using the ascertained transmission behavior or the recognized system element identifier. Consequently a system model having this transmission function can be subsequently designed. Here, the calculation result is expediently displayed on operating/monitor unit 360. In a practical refinement, the calculated transmission function is also stored in storage unit 330, which function need only be read out of the storage device for subsequent further use.

Consequently, if a method of data correlation between the data of a system model and the data of a control and/or data transmission system based on it is to be performed in essentially the opposite direction in order to design a system model having at least one transmission function for modeling a control and/or data transmission system with at least one system element, this is done according to the preferred embodiment by first constructing at least one system element for producing a control and/or data transmission system. Then the connection or integration of the system element in the (sub)system is checked by analyzing the system element, specifically by applying a predetermined input signal and evaluating the respective output signal, the transmission behavior is ascertained and/or a system element identifier is recognized, preferably automatically, and the transmission function specifying the system element is calculated using the ascertained transmission behavior and/or the recognized system element identifier. The transmission function calculated for the system element is expediently stored for further use, particularly for completing the system model. There as well, the system element can comprise an individual system component, a subsystem or even the entire system.

The invention thus makes possible the processing of data from operating means cooperating to implement a system and of the associated signaling.

On the one hand, generated data that represents the signal paths, the signaling and the transitions on the user level is directly used to test, as a function of this data, the transmission paths of operating means on the physical level for implementing this system.

Additionally and/or alternatively, generated data that represents the signal paths, signaling and transitions on the physical plane is used directly to test, as a function of this data, the transmission paths of operating means on the user level for implementing this system.

Independently of the correlation direction, the analysis and design steps thus substantially comprise in an expedient manner the generation of a dataset that is unambiguously associated with the connection or integration of analyzing system element into the system.

A user can thus, on the basis of a system model, test an operating means or system element for its wiring or installation in the system, for instance, in relation to the connection to a cable to be used or a port to be used, and also pass on additional information such as the parameterization and/or the MAC address in Ethernet-capable operating means from the tested site to the system via the data-processing device. The user is consequently also capable of connecting or exchanging a suitable system element or operating means rapidly and reliably at any point of the system and connecting it to an additional operating means and/or signal, and of subsequently reporting this to the system. Moreover this information, such as operating means designations from ECAD systems, can simultaneously be used for labeling the operating means or system elements.

In the opposite data correlation direction, i.e., in the case of a control and/or data transmission system to be constructed, in which first of all the construction, including the wiring of the individual operating means or system elements takes place, a user is thus capable of transferring the input and/or ascertained data to a resultant planning process. Thus the label of the operating means can also be registered in the installation of an operating means or system element such as a bus module. This registered label is input into the system, recognized as such there or by a data-processing device, and thus is immediately available for planning.

What is claimed is:

1. A data-processing device for testing the functionality of a system element to be used inside a control and/or data transmission system, wherein the system comprises a plurality of positions connected respectively by a signal path inside the system, or for designing a system model for modeling the system, comprising:

a signal unit that, when coupled to a system element that is constructed for a first predetermined position from the plurality of positions, reads out, queries or receives a signal output of the constructed system element in response to a predetermined signal input applied by the signal unit at the constructed system element, wherein the predetermined signal input corresponds with a signal outputted from a second predetermined position from the plurality of positions, which is different from the first predetermined position;

an evaluation unit constructed for evaluating the signal output from the first predetermined position as a function of the predetermined signal input in order to analyze the constructed system element and for automatically recognizing a system element identifier;

a storage unit for providing readable storage of transmission functions of the system model; and a computer-assisted processing unit, wherein the computer-assisted processing unit either:

i) analyzes the automatically recognized system element identifier using at least one stored transmission function of the storage unit in order to associate the automatically recognized system element identifier with the at least one stored transmission function for associating the analyzed constructed system element with the at least one stored transmission function, or ii) calculates a transmission function using the automatically recognized system element identifier in order to associate the automatically recognized system element identifier with the calculated transmission function for associating the analyzed constructed system element with the calculated transmission function.

2. The data-processing device according to claim 1, wherein the evaluation unit is constructed to determine a transmission behavior.

3. The data-processing device according to claim 2, wherein the computer-assisted processing unit analyzes the determined transmission behavior using at least one stored transmission function in order to associate the determined transmission behavior with the at least one stored transmission function.

4. The data-processing device according to claim 2, wherein the computer-assisted processing unit associates the determined transmission behavior and/or the automatically recognized system element identifier with the calculated transmission function.

5. The data-processing device according to claim 1, further comprising a display device for displaying the results of the analysis and/or the association.

6. The data-processing device according to claim 1, wherein the at least one transmission function of a system model representing the created control and/or data transmission system is stored in the storage unit.

7. The data-processing device according to claim 1, wherein the computer-assisted processing unit calculates the transmission function, using a determined transmission behavior to associate the determined transmission behavior with the calculated transmission function.

8. The data-processing device according to claim 7, further comprising the storage unit for providing the readable storage of calculated transmission functions.

9. The data-processing device according to claim 7, further comprising a display device for displaying the calculation result.

10. The data-processing device according to claim 1, wherein the signal unit comprises a signal supply unit for connection to the constructed system element.

11. The data-processing device according to claim 1, wherein the data-processing device is a PC, laptop or notebook computer.

* * * * *